(12) United States Patent
Ferrero et al.

(10) Patent No.: US 10,037,774 B1
(45) Date of Patent: Jul. 31, 2018

(54) SLIDERS HAVING FEATURES IN THE MID GAP

(71) Applicant: SEAGATE TECHNOLOGY LLC, Cupertino, CA (US)

(72) Inventors: Pietro Ferrero, Minneapolis, MN (US); Igor V. Sytine, Plymouth, MN (US); Gary J. Kunkel, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/700,584

(22) Filed: Sep. 11, 2017

Related U.S. Application Data

(63) Continuation of application No. 15/337,241, filed on Oct. 28, 2016, now Pat. No. 9,761,260.

(60) Provisional application No. 62/247,554, filed on Oct. 28, 2015.

(51) Int. Cl.
*G11B 5/60* (2006.01)
(52) U.S. Cl.
CPC ................. *G11B 5/6082* (2013.01)
(58) Field of Classification Search
CPC ............... G11B 5/60; G11B 5/6082
USPC ............................. 360/236–236.5
See application file for complete search history.

(56) References Cited

U.S. PATENT DOCUMENTS

| 8,810,968 | B2 | 8/2014 | Rajasekharan |
| 2001/0002159 | A1* | 5/2001 | Morita ................ G11B 5/012 360/246.1 |
| 2002/0030938 | A1 | 3/2002 | Boutaghou |
| 2003/0206374 | A1 | 11/2003 | Ueda |
| 2005/0213252 | A1 | 9/2005 | Park |
| 2006/0176616 | A1 | 8/2006 | Ueda |
| 2007/0188925 | A1 | 8/2007 | Ishihara |

\* cited by examiner

*Primary Examiner* — Allen T Cao
(74) *Attorney, Agent, or Firm* — Mueting, Raasch & Gebhardt, P.A.

(57) ABSTRACT

Sliders that include a slider body having an outer side edge, an inner side edge, a trailing edge and a leading edge, and a base; a trailing edge set of features positioned towards the trailing edge of the slider body, the trailing edge set of features having air bearing surfaces, the air bearing surfaces being above the base of the slider body; a leading edge set of features positioned towards the leading edge of the slider body; a gap positioned between the trailing edge set of features and the leading edge set of features, the gap having a gap surface, the gap surface substantially coplanar with the base of the slider body; and a first gap feature and a second gap feature distributed evenly within the gap from the inner side edge to the outer side edge, the first and second gap features each having upper surfaces, the upper surfaces of the first and second gap features being above the base of the slider body but below the air bearing surface of the trailing edge features.

17 Claims, 11 Drawing Sheets

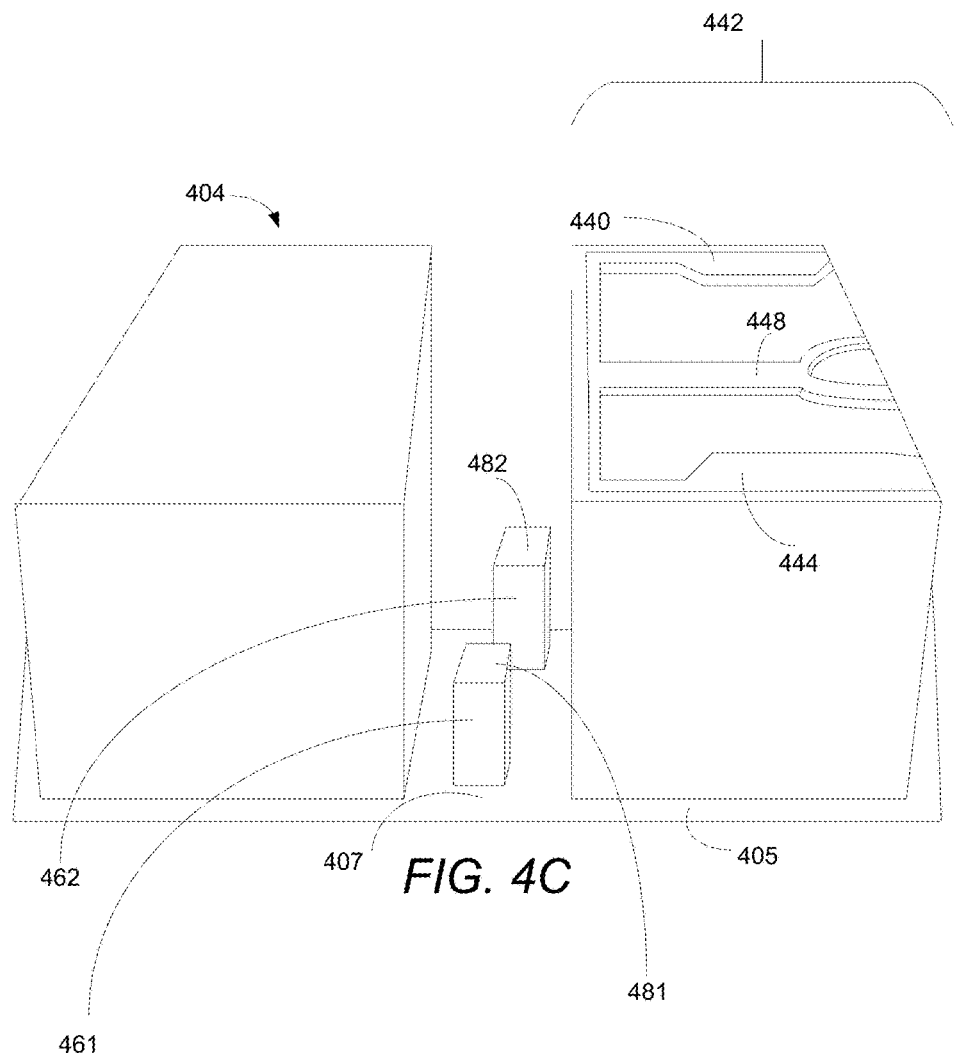

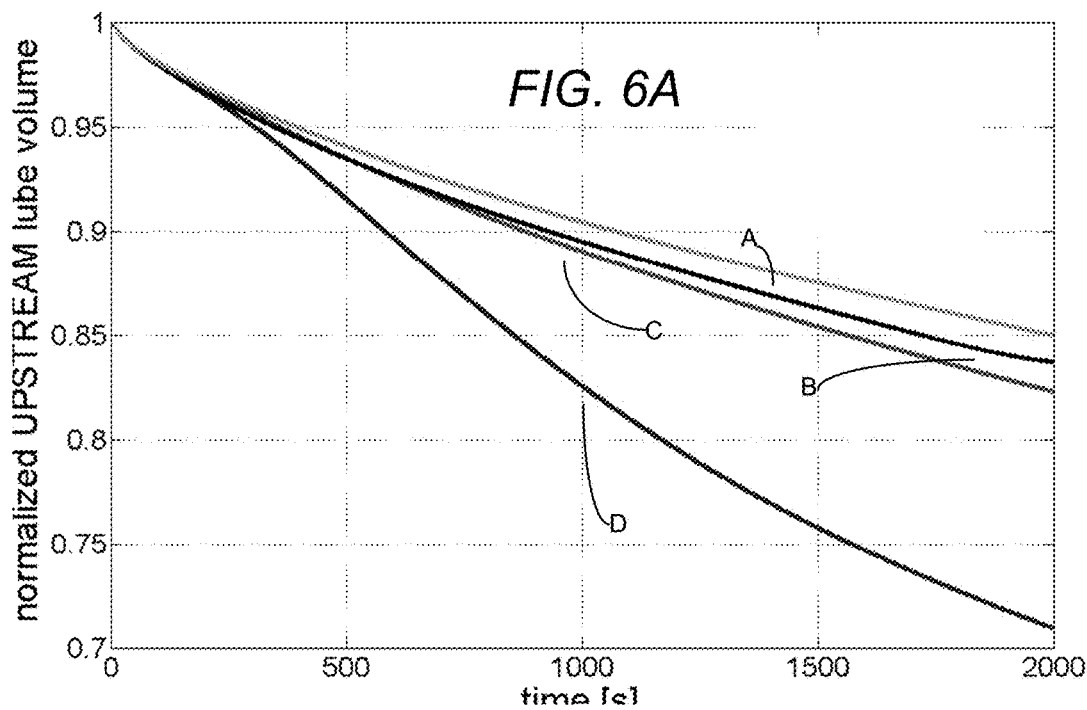
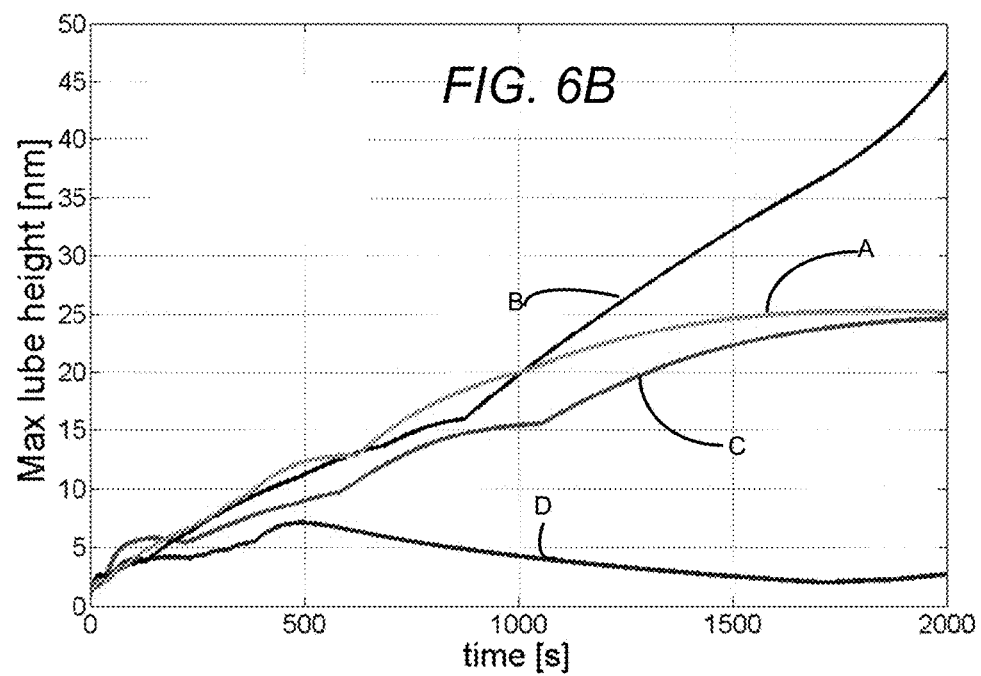

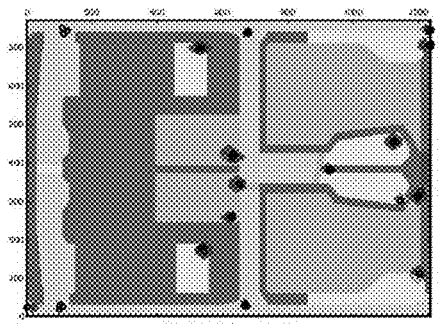
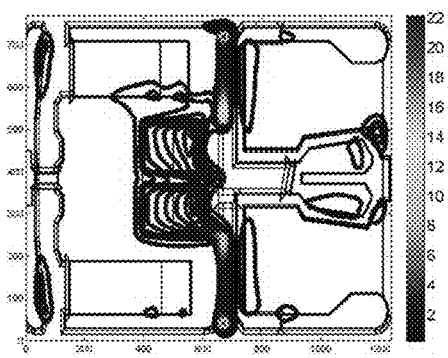
FIG. 7A
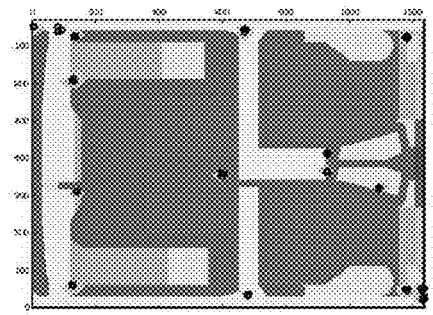
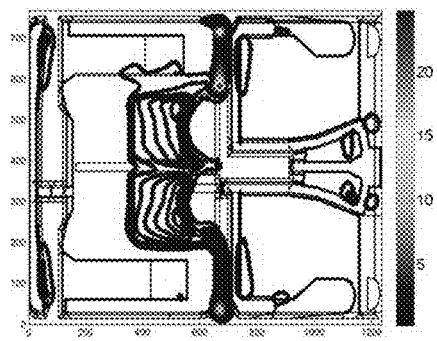
FIG. 7B

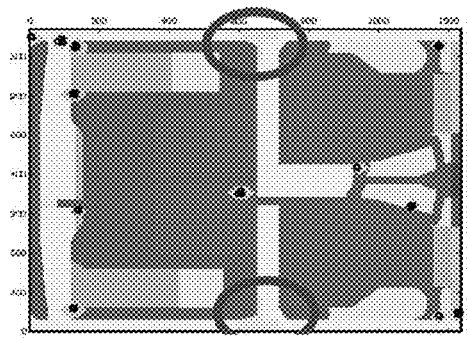
FIG. 7C
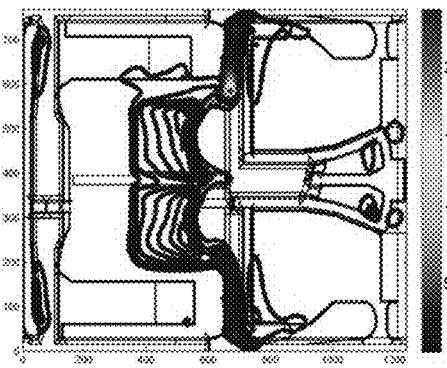
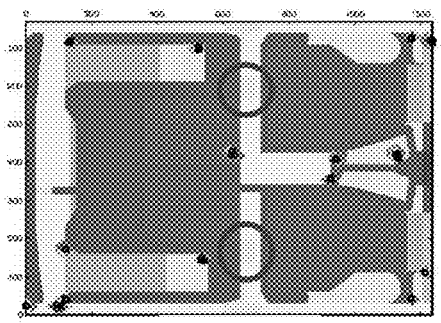
FIG. 7D
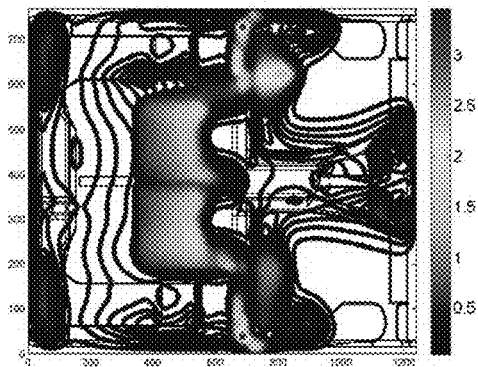

SLIDERS HAVING FEATURES IN THE MID GAP

PRIORITY

This application claims priority to U.S. Provisional Application No. 62/247,554 entitled "SLIDERS HAVING FEATURES IN THE MID GAP" filed on Oct. 28, 2015, the disclosure of which is incorporated herein by reference thereto.

BACKGROUND

Lubricant on rotating magnetic storage discs act as a protective coating for preventing corrosion of the magnetic layers of the disc. During the operation of a hard-disc, the air-bearing (that holds the magnetic elements) flies over the disc. During this process, it interacts with the lubricant coating on the disc. Some of the these interactions result in transfer of lubricant from the disc to the air bearing, where it can migrate to different areas of the head due to the joint effects of pressure and shear stresses. A similar mechanism is responsible for the accumulation on the head of organic contaminants, which originate mainly from the motor oil used in the spindle. The transferred lubricant and contaminants can accumulate in specific areas of the air bearing and eventually drop onto the disc. Such phenomena can affect reliability of the disc and in some cases even cause failures. Therefore, there remains a need to manage lubricant/contaminant on the air bearing.

SUMMARY

Disclosed herein are sliders that include a slider body having an outer side edge, an inner side edge, a trailing edge and a leading edge, and a base; a trailing edge set of features positioned towards the trailing edge of the slider body, the trailing edge set of features having air bearing surfaces, the air bearing surfaces being above the base of the slider body; a leading edge set of features positioned towards the leading edge of the slider body; a gap positioned between the trailing edge set of features and the leading edge set of features, the gap having a gap surface, the gap surface substantially coplanar with the base of the slider body; and a first gap feature and a second gap feature distributed evenly within the gap from the inner side edge to the outer side edge, the first and second gap features each having upper surfaces, the upper surfaces of the first and second gap features being above the base of the slider body but below the air bearing surface of the trailing edge features.

Also disclosed are sliders that include a slider body having an outer side edge, an inner side edge, a trailing edge and a leading edge, and a base; a trailing edge set of features positioned towards the trailing edge of the slider body, the trailing edge set of features having air bearing surfaces, the air bearing surfaces being above the base of the slider body; a leading edge set of features positioned towards the leading edge of the slider body; a gap positioned between the trailing edge set of features and the leading edge set of features, the gap having a gap surface, the gap surface substantially coplanar with the base of the slider body and the gap having a length from the trailing edge set of features to the leading edge set of features; and a first gap feature and a second gap feature distributed evenly within the gap from the inner side edge to the outer side edge, the first and second gap features each having upper surfaces, the upper surfaces of the first and second gap features being above the base of the slider body but below the air bearing surface of the trailing edge features and the first gap feature and the second gap feature having lengths along the plane from the trailing edge set of features to the leading edge set of features, wherein the length of the first gap feature and the second gap feature are less than the length of the gap.

Further disclosed are sliders that includes a slider body having an outer side edge, an inner side edge, a trailing edge and a leading edge, and a base; a trailing edge set of features positioned towards the trailing edge of the slider body, the trailing edge set of features having air bearing surfaces, the air bearing surfaces being above the base of the slider body; a leading edge set of features positioned towards the leading edge of the slider body; a gap positioned between the trailing edge set of features and the leading edge set of features, the gap having a gap surface, the gap surface substantially coplanar with the base of the slider body; and a first gap feature and a second gap feature distributed evenly within the gap from the inner side edge to the outer side edge, the first and second gap features each having upper surfaces, the upper surfaces of the first and second gap features being above the base of the slider body but below the air bearing surface of the trailing edge features, wherein the length of the first and second gap features span the gap along a plane from the trailing edge to the leading edge.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

FIGS. 4A, 4B, 4C and 4D illustrate views of illustrative sliders with 4A, 4B and 4D being bottom plan views and 4C being an enlarged bottom perspective view of disclosed embodiments.

FIGS. 6A and 6B show plots of normalized lubricant volume (FIG. 6A) and maximum lubricant height (nm) versus time for four different slider bodies.

FIGS. 7A, 7B, 7C and 7D are configurations of slider bodies and contour plots of lubricant accumulation utilized to obtain FIGS. 6A and 6B.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Embodiments described herein include a slider having a slider body with a trailing edge and a leading edge. To minimize the accumulation of lubricant on the slider body from the data storage medium, features are included in a gap at the middle between the trailing edge and the leading edge on the slider body. The gap features may function to minimize accumulation of lubricant contaminant on the air bearing surface of the slider.

Figure 1:
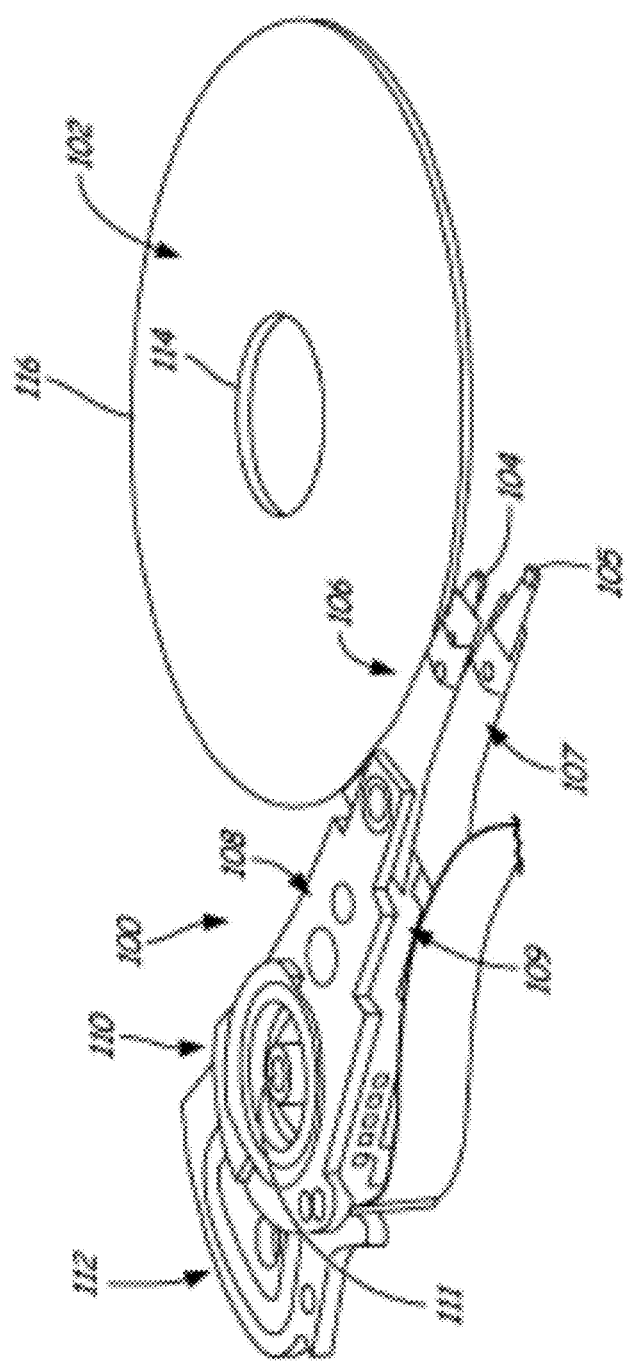
FIG. 1 illustrates a perspective view of illustrative components of a data storage device including a head stack assembly and a data storage medium.

FIG. 1 illustrates a perspective view of illustrative components of a data storage device including a head stack assembly 100 and date storage medium 102. Medium 102 stores information on a plurality of circular, concentric data tracks and is mountable to a spindle motor assembly that can rotate medium 102 and cause its data surfaces to pass under respective bearing slider surfaces. As illustrated, each surface of medium 102 has an associated header or slider 104 and 105, which carries transducers that communicate with a surface of medium 102.

Each slider 104 and 105 is supported by a head gimbal assembly (HGA) 106 and 107, which are in turn attached to an actuator arm 108 and 109 of an actuator mechanism 110 to form a Head Stack Assembly (HSA) 100. Actuator mechanism 110 is rotated about a shaft 111 by a voice coil motor 112, which is controlled by servo control circuitry. Voice coil motor 112 rotates actuator mechanism 110 to position sliders 104 and 105 relative to desired data tracks between an inner diameter 114 and an outer diameter 116 of medium 102.

Before describing detailed embodiments of sliders that have lubricant control features, an overview of lubricant accumulation is discussed. Lubricant on a surface of a storage medium or rotating disc acts as a protective coating for preventing corrosion to the magnetic layers lying beneath its surface. During the operation of a data storage device, the bearing of the slider flies over the storage medium or disc. In this process, the bearing interacts with the lubricant coating on the medium or disc, the effects of which can be seen as various signatures on the head-medium interface. Some of these interactions are mechanically driven due to the shear on the medium, such as air-shear. One common signature is due to the mechanical lube pickup when the lubricant rips off the disc under high air-shear at the trailing edge (TE) of the slider and then subsequently pulls through the TE of the slider because of the existing backflow in that region (i.e., negative pressure gradients at the TE). The lube that enters the slider in this manner can accumulate in stagnation or low-velocity zones and can cause significant read/write performance disruptions.

Figure 2:
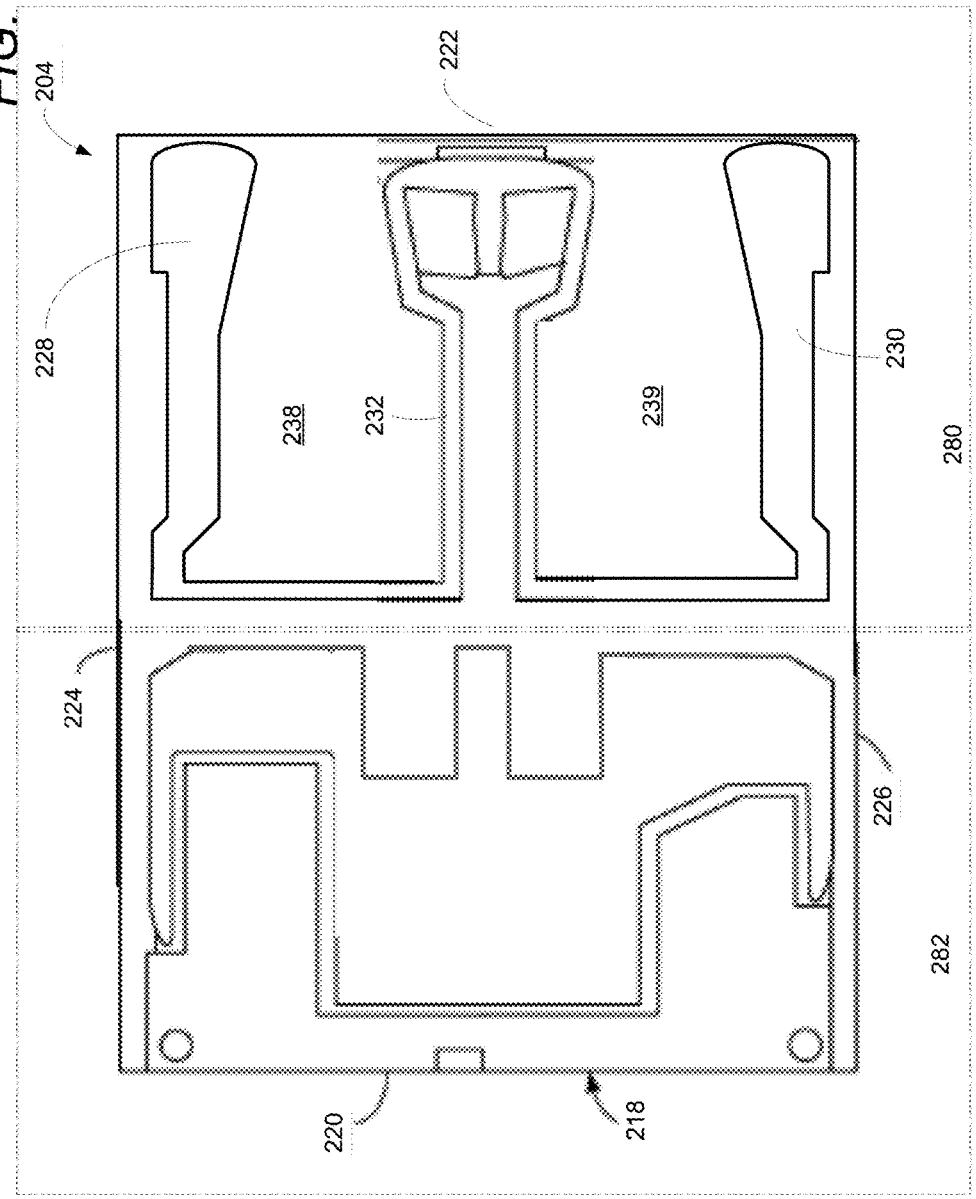
FIG. 2 illustrates an enlarged bottom plan view of a slider according to disclosed embodiments.

FIG. 2 illustrates an enlarged bottom plan view of an illustrative embodiment of a slider 204. Slider 204 includes a slider body 218 having a leading edge 220, a trailing edge 222, an outer side edge 224 and an inner side edge 226. Edge 224 is defined as an outer side edge because it is oriented towards the outer diameter of a data storage medium when the slider 204 is attached to an HSA, such as HSA 100 illustrated in FIG. 1. Edge 226 is defined as an inner side edge because it is oriented towards the inner diameter of a data storage medium when the slider is attached to an HSA, such as HSA 100 illustrated in FIG. 1.

Slider 204 can include an outer rail 228, an inner rail 230 and a center rail 232. Outer rail 228 is positioned between trailing edge 222 and leading edge 220 and is adjacent outer side edge 224 of slider body 218. Inner rail 230 is positioned between trailing edge 222 and leading edge 220 and is adjacent inner side edge 226 of slider body 218. Center rail 232 is also positioned between trailing edge 222 and leading edge 220 of slider body 218 and is positioned between and spaced apart from outer rail 228 and inner rail 230. Defined between outer rail 228 and center rail 232 is a first cavity having a cavity surface or floor 238. Defined between inner rail 230 and center rail 232 is a second cavity having a cavity surface or floor 239. A portion of each of outer rail 228, inner rail 230 and center rail 232 includes a bearing surface, while other portions of each of outer rail 228, inner rail 230 and center rail 232 include step surfaces. Outer rail 228, inner rail 230 and center rail 232 all protrude from cavity surfaces or cavity floors 238 and 239. All of outer rail 228, inner rail 230 and center rail 232 are within the trailing edge zone 280, which is indicated by the dashed line box. Also present is leading edge zone 282.

Figure 3:
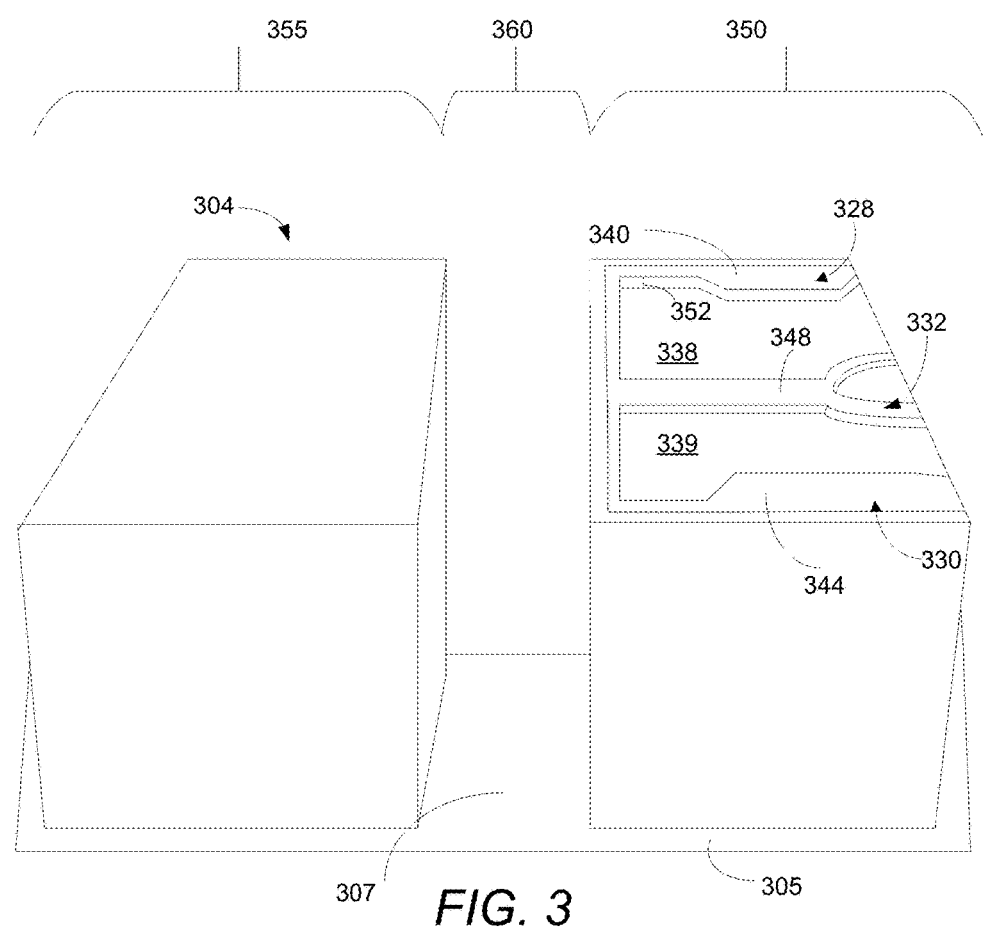
FIG. 3 illustrates an enlarged bottom perspective view of a slider.

FIG. 3 illustrates an enlarged bottom perspective view of slider 304. The slider 304 includes a slider base 305. As illustrated, outer rail 328 includes bearing surface 340. Inner rail 330 includes bearing surface 344. Center rail 332 includes bearing surface 348. Bearing surfaces 340, 344 and 348 are defined by a bearing surface height 352. Bearing surface height 352 is the distance from which bearing surfaces 340, 344 and 348 of outer rail 328, inner rail 330 and center rail 332 protrude from cavity surfaces 338 and 339 of slider body 318. FIG. 3 also illustrates the gap, 360 between the trailing edge set of features 350 and the leading edge set features 355 and the gap surface 307.

Although illustrative features, such as outer rail 228, inner rail 230 and center rail 232 have been depicted in FIGS. 2 and 3, any features in the trailing edge zone 280, the leading edge zone 282, or both could be present in disclosed embodiments. Furthermore, the particular configuration of any of the trailing edge features 350 or the leading edge features 355 depicted herein should not be taken as limiting to this disclosure. Any type of features in the trailing edge zone 280, the leading edge zone 282 or both could be utilized with disclosed embodiments of sliders herein.

Figure 4A:
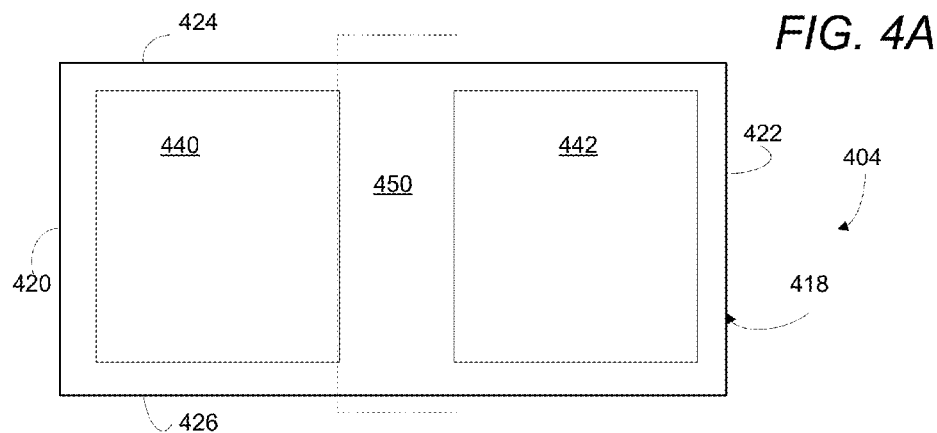

FIG. 4A illustrates a bottom plan view of an illustrative slider 404. Slider 404 includes a slider body 418 having a leading edge 420, a trailing edge 422, an outer side edge 424 and an inner side edge 426. The slider 404 depicted in FIG. 4A also includes a trailing edge set of features 442. The trailing edge set of features 442 are so named because they are positioned towards the trailing edge 422 of the slider body 418. In the illustration in FIG. 4A, the trailing edge set of features 442 are depicted simply as a box, but it should be understood that any different configurations of features could be included in the trailing edge set of features 442. Although not depicted in FIG. 4A, the trailing edge set of features 442 have air bearing surfaces, which are located above the base of the slider body 418. The slider 404 also includes a leading edge set of features 440. The leading edge set of features 440 are so named because they are positioned towards the leading edge 420 of the slider body 418. In the illustration in FIG. 4A, the leading edge set of features 440 are depicted simply as a box, but it should be understood that any different configuration of features could be included in the leading edge set of features 440.

The slider 418 depicted in FIG. 4A also includes a gap 450. The gap 450 is positioned between the trailing edge set of features 442 and the leading edge set of features 440. The gap 450 has a gap surface that is substantially coplanar with the base of the slider body (the gap surface 307 is depicted in FIG. 3). In disclosed embodiments of sliders, features, named gap features, are disposed in the gap. The features in the gap may allow lubricant/contaminant on the air bearing surface to be more effectively flushed out by the effect of shear stress or more evenly distributed across the slider.

Figure 4B:
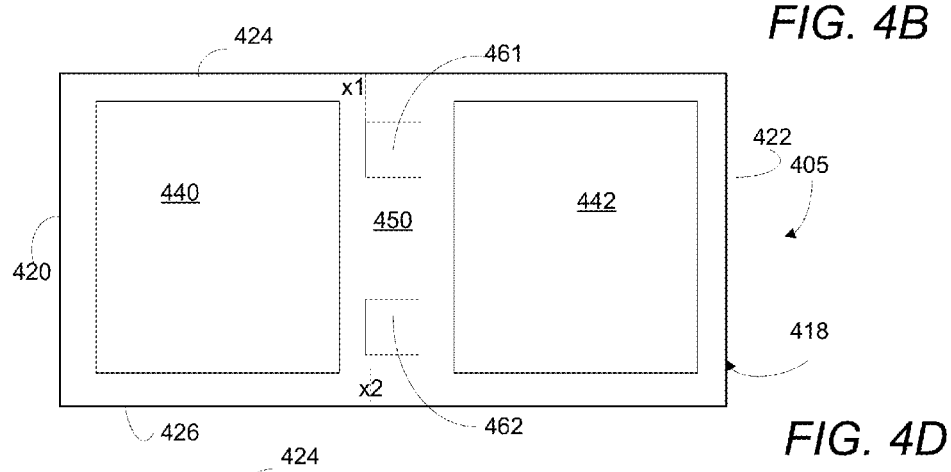

FIG. 4B shows another bottom plan view of an illustrative slider 405. This illustrative slider includes two features in the gap 450. The features can be referred to as first feature 461 and second feature 462. The first feature 461 and the second feature 462 may, but need not have the same dimensions. In some embodiments, the first and second features are distributed evenly within the gap from the inner side edge 426 to the outer side edge 424. Therefore, a distance x1 from the first gap feature 461 to the outer side edge 424 would be the same as the distance x2 from the second gap feature 462 to the inner side edge 426. The first and second features 461 and 462 could also be described by their distances from the perimeters of the trailing edge features 442 and the leading edge features 440. The first and second features 461 and 462 could also be described by the distance therebetween.

The first and second features have surfaces, similar to how the trailing edge features had surfaces, as seen in FIG. 4C. The surfaces 481 and 482 of both the first and second features 461 and 462 can be described as being above the surface of the base 405 but below the air bearing surfaces 440, 444, and 448 of any of the trailing edge features 442. The surfaces 481 and 482 of both the first and second features 461 and 462 can be described by their height above the surface of the base 405. Alternatively, the surfaces 481 and 482 of both the first and second features 461 and 462 can be described by their height below the highest air bearing surface. The highest air bearing surface is a surface that is the farthest away from the base of the slider. The surfaces 481 and 482 of the first and second features 461 and 462 can, but need not be the same. In some embodiments, the first and second features 461 and 462 can independently be not less than 1.0 µm above the base of the slider body, or in some embodiments not less than 2.4 µm above the base of the slider body. In some embodiments, the first and second features 461 and 462 can independently be not greater than 4.5 µm above the base of the slider body, or in some embodiments not greater than 3.8 µm above the base of the slider boy. In some embodiments, the first and second features 461 and 462 can independently be not less than 0.1 µm below the highest air bearing surface, or not less than 0.15 µm below the highest air bearing surface. In some embodiments, the first and second features 461 and 462 can independently be not greater than 0.3 µm below the highest air bearing surface, or in some embodiments not greater than 0.28 µm below the highest air bearing surface.

In some embodiments, the gap features can span the entire distance between the back edge of the trailing edge set of features 442 and the front edge of the leading edge set of features 440. In some embodiments, the gap features do not span the entire distance from the back edge of the trailing edge set of features 442 to the front edge of the leading edge set of features 440.

In some embodiments, the first and second gap features can be described by their dimensions. The width of a gap feature can be the width along a plane from the inner edge to the outer edge, and the length of a gap feature can be the length along a plane from the trailing edge to the leading edge, with the height being the distance of the surface of a gap feature from the base of the slider. In some embodiments, the width and length of a gap feature can independently be not less than 20 µm, or not less than 30 µm, or not less than 30 µm. In some embodiments, the width and length of a gap feature can independently be not greater than 150 µm, not greater than 120 µm, not greater than 80 µm, not greater than 70 µm, or not greater than 65 µm, for example. In some embodiments, the width and length of a gap feature can independently range from 20 µm to 80 µm. In some embodiments, the width and length of a gap feature can independently range from 30 µm to 70 µm. In some embodiments, the width and length of a gap feature can independently range from 40 µm to 65 µm.

In some embodiments, the first and second gap features do not necessarily block the entire gap so that their impact on the flying performance of the original air bearing is minimal. Two gap features, instead of one gap feature will likely not greatly affect the flyability of the air bearing and may also stop or minimize the ability of the lube accumulation points from simply shifting from one side to the other. The first and second gap features may function to eliminate the lubricant accumulation zones that are present in previously utilized slider designs.

Figure 4D:
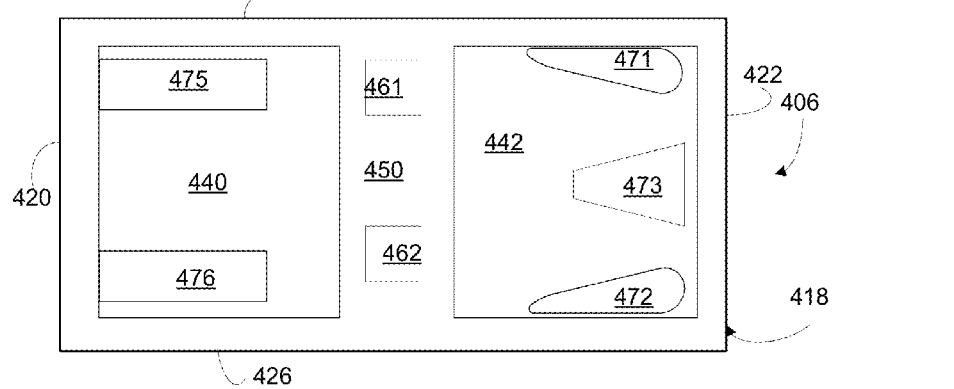

FIG. 4D illustrates another bottom plan view of an illustrative slider 406. The illustrative slider 406 includes a trailing edge set of features 442 that include an inner feature 471, an outer feature 472 and a center feature 473. The trailing edge set of features 442 have air bearing surfaces, which are located above the base of the slider body 418. The slider 406 also includes a leading edge set of features 440 that include a first and second rail 475 and 476. The leading edge set of features 440 have air bearing surfaces, which are located above the base of the slider body 418. It will be understood that trailing edge features and leading edge features can have characteristics similar to or different from those depicted herein. The slider 406 also includes a first and a second gap features 461 and 462 in the gap 450. The first and second gap features 461 and 462 can have characteristics such as those discussed above with respect to FIG. 4C, for example.

Figure 5:
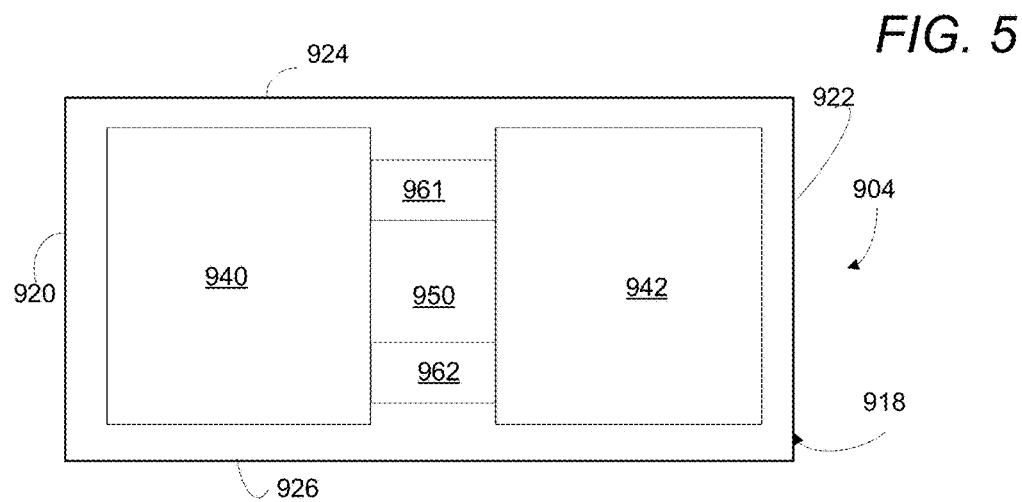
FIG. 5 is a bottom plan view of a disclosed embodiment.

In some embodiments, the first and second gap features may span the entire gap. FIG. 5 shows an illustrative bottom plan view of a slider. Slider 904 includes a slider body 918 having a leading edge 920, a trailing edge 922, an outer side edge 924 and an inner side edge 926. The slider can include any trailing edge features 942 and any leading edge features 940. The slider also includes a gap 950. Within the gap 950 are first and second gap features 961 and 962. In some embodiments, such as the one depicted here, the first and second gap features 961 and 962 span the entire gap from the back edge of the trailing edge features 942 to the front edge of the leading edge features 940. Such embodiments may offer the advantage of decreasing the RPM (rotation per minute) sensitivity of the air bearing and may be especially helpful in high speed applications for example.

In some embodiments, in order to determine where gap features should be placed, the size of gap features, or any combination thereof, lube accumulation points should be identified in the gap. Once identified, the lube accumulation points can be mitigated with gap features at particular locations, gap features of particular sizes, or combinations thereof.

Examples

In some embodiments, models that attempt to explain and predict the migration of lubricant/contaminant on a slider can be utilized. In short, the height of the lubricant/contaminant (h) can be solved for using thin-film equations. A Dirichlet boundary condition is imposed with a very small value for h on four sides of the air bearing surface. The initial condition can be assumed to be that the height of the lube is zero (0) on the recessed surfaces and the height equals 1 mm on the air bearing surfaces. Modeling tools can simulate the time evolution of a thin layer of lubricant on the head by solving thin-film flow transport equations FIG. 6A shows a plot of total lubricant/contaminant volume versus time (seconds) for four different configurations modeled as discussed above: A, B, C, and D. The configurations of A, B, C, and D can be seen in FIGS. 7A, 7B, 7C and 7D respectively. The top portion of each of FIGS. 7A, 7B, 7C and 7D shows the configuration, with the colors showing the height above the base and the bottom portion of each figure shows wherein the lubricant/contaminant aggregates. The results show that the C configuration is better than both A and B and configuration D is better than C. FIG. 6B shows a plot of maximum lube height (nm) versus time for the four configurations, as seen there, configuration D maintains the lowest lubricant/contaminant height. The maximum lube height in configuration D is about six times smaller than in configuration C, which should result in less lubricant dumping and thus decreased modulation of the head.

Figure 8A:
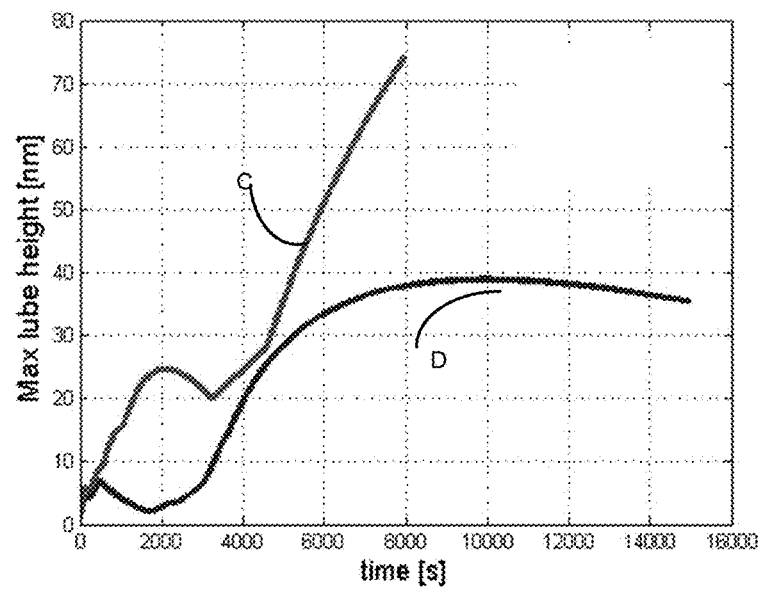
FIGS. 8A and 8B show plots of maximum lubricant height (nm) (FIG. 8A) and normalized lubricant volume versus time for a disclosed embodiment of a slider and a comparative slider body.
Figure 8B:
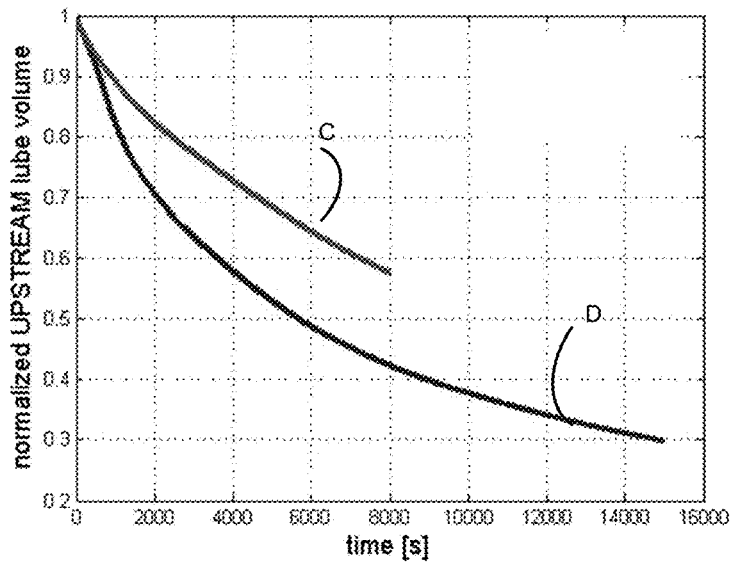

FIGS. 8A and 8B show a longer time span simulation that compares configuration D to C. FIG. 8A shows the maximum lube height (nm) versus time (seconds) for both configuration C and D. FIG. 8B shows the normalized upstream lubricant volume versus time (seconds) for both configuration C and D. As seen from this result, configuration D was much more effective at flushing away lubricant on the sides than C in a longer term simulation. Configuration C had a lubricant accumulation area, which caused the simulation to become unstable after 8000 seconds, while configuration D remained stable past 8000 seconds.

Figure 9A:
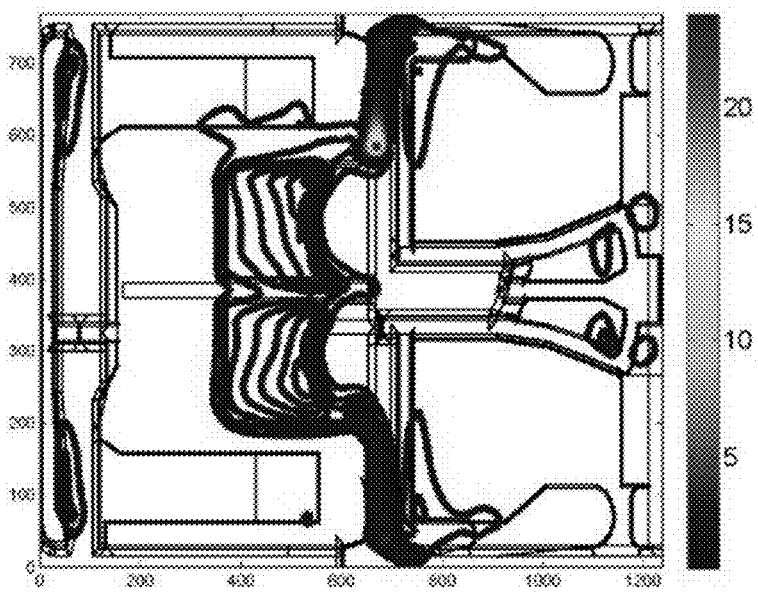
FIGS. 9A and 9B are contour plots of lubricant accumulation for a disclosed embodiment of a slider body (FIG. 9B) and a comparative slider body (FIG. 9A).
Figure 9B:
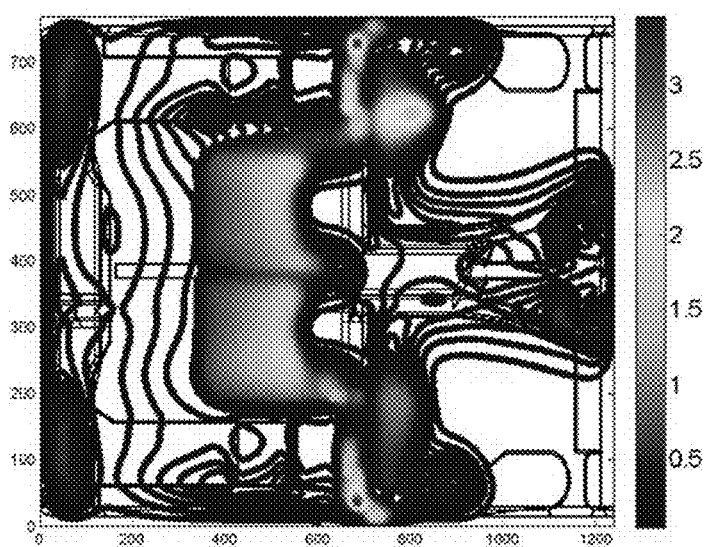

FIGS. 9A and 9B show contour plots of the total lubricant height on the air bearing surface of a previously utilized design (FIG. 9A) and a design with gap features (FIG. 9B). Both simulations have been run up to 2000 seconds from the same initial condition (1 nm of lube height only on the air bearing surfaces) and are for flow conditions at the outer diameter (OD).

From a comparison of FIGS. 9A and 9B, it is evident that the previously utilized design exhibits a significant lube accumulation (>24 nm) in a small area in the mid-trench, right past the ABS surface. This lube/contaminant accumulation point is completely removed by adding the two gap features (assumed to be 0.23 µm high, 43 µm long and 61 µm wide in this model). The total height of the lube/contaminant layer in the design with the two gap features becomes less than 2 nm in the problem area of FIG. 9A.

Thus, embodiments of sliders having features in the mid gap are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A slider comprising:
    a slider body having an outer side edge, an inner side edge, a trailing edge and a leading edge, and a base;
    a trailing edge set of features positioned towards the trailing edge of the slider body, the trailing edge set of features having air bearing surfaces, the air bearing surfaces being above the base of the slider body, the trailing edge set of features comprising an outer rail, an inner rail and a center rail
    a leading edge set of features positioned towards the leading edge of the slider body;
    a gap positioned between the trailing edge set of features and the leading edge set of features, the gap having a gap surface, the gap surface substantially coplanar with the base of the slider body; and
    a first gap feature and a second gap feature distributed evenly within the gap from the inner side edge to the outer side edge, the first and second gap features each having upper surfaces, the upper surfaces of the first and second gap features being from 1.0 to 4.0 µm above the base of the slider body but below the air bearing surface of the trailing edge features.

2. The slider according to claim 1, wherein the first and the second gap features do not span the entire distance between the trailing edge set of features and the leading edge set of features.

3. The slider according to claim 1, wherein the first and second gap features do span the entire distance between the trailing edge set of features and the leading edge set of features.

4. The slider according to claim 1, wherein the gap spans the distance from the outer side edge to the inner side edge of the slider body.

5. The slider according to claim 1, wherein the upper surfaces of the first and second gap features are from 0.1 µm to 0.3 µm below a highest air bearing surface of the slider.

6. The slider according to claim 1, wherein the upper surfaces of the first and second gap features are from 0.15 µm to 0.28 µm below a highest air bearing surface of the slider.

7. The slider according to claim 1, wherein the first and second gap features independently have lengths along a plane from the trailing edge to the leading edge and widths along a plane from the outer side edge to the inner side edge from 20 to 150 μm.

8. A slider comprising:
- a slider body having an outer side edge, an inner side edge, a trailing edge and a leading edge, and a base;
- a trailing edge set of features positioned towards the trailing edge of the slider body, the trailing edge set of features having air bearing surfaces, the air bearing surfaces being above the base of the slider body;
- a leading edge set of features positioned towards the leading edge of the slider body;
- a gap positioned between the trailing edge set of features and the leading edge set of features, the gap having a gap surface, the gap surface substantially coplanar with the base of the slider body and the gap having a length from the trailing edge set of features to the leading edge set of features; and
- a first gap feature and a second gap feature distributed evenly within the gap from the inner side edge to the outer side edge, the first and second gap features each having upper surfaces, the upper surfaces of the first and second gap features being from 1.0 to 4.0 μm above the base of the slider body but below the air bearing surface of the trailing edge features and the first gap feature and the second gap feature having lengths along the plane from the trailing edge set of features to the leading edge set of features,
- wherein the length of the first gap feature and the second gap feature are less than the length of the gap.

9. The slider according to claim 8, wherein the upper surfaces of the first and second gap features are from 0.1 μm to 0.3 μm below a highest air bearing surface of the slider.

10. The slider according to claim 8, wherein the upper surfaces of the first and second gap features are from 0.15 μm to 0.28 μm below a highest air bearing surface of the slider.

11. The slider according to claim 8, wherein the first and second gap features independently have lengths along a plane from the trailing edge to the leading edge from 20 to 120 μm.

12. The slider according to claim 8, wherein the first and second gap features independently have widths along a plane from the outer side edge to the inner side edge from 20 to 120 μm.

13. The slider according to claim 8, wherein the first and second gap features have the same lengths, widths and distance from the upper surface to the base of the slider.

14. A slider comprising:
- a slider body having an outer side edge, an inner side edge, a trailing edge and a leading edge, and a base;
- a trailing edge set of features positioned towards the trailing edge of the slider body, the trailing edge set of features having air bearing surfaces, the air bearing surfaces being above the base of the slider body;
- a leading edge set of features positioned towards the leading edge of the slider body;
- a gap positioned between the trailing edge set of features and the leading edge set of features, the gap having a gap surface, the gap surface substantially coplanar with the base of the slider body; and
- a first gap feature and a second gap feature distributed evenly within the gap from the inner side edge to the outer side edge, the first and second gap features each having upper surfaces, the upper surfaces of the first and second gap features being from 1.0 to 4.0 μm above the base of the slider body but below the air bearing surface of the trailing edge features,
- wherein the length of the first and second gap features span the gap along a plane from the trailing edge to the leading edge.

15. The slider according to claim 14, wherein the first and second gap features independently have widths along a plane from the outer side edge to the inner side edge from 20 to 150 μm.

16. The slider according to claim 14, wherein the upper surfaces of the first and second gap features are from 0.1 μm to 0.3 μm below a highest air bearing surface of the slider.

17. The slider according to claim 14, wherein the first and second gap features have the same lengths, widths and distance from the upper surface to the base of the slider.

\* \* \* \* \*